United States Patent
Toda et al.

(10) Patent No.: US 6,672,769 B2
(45) Date of Patent: Jan. 6, 2004

(54) BEARING APPARATUS AND PRODUCING METHOD THEREOF

(75) Inventors: Kazutoshi Toda, Osaka (JP); Masahiro Inoue, Nara (JP); Kenji Takahashi, Nara (JP); Teruyuki Kawatani, Nara (TW); Shinichirou Kashiwagi, Osaka (JP); Teruyuki Wakisaka, Nara (JP); Tadashi Mitarai, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/902,245

(22) Filed: Jul. 10, 2001

(65) Prior Publication Data

US 2002/0172444 A1 Nov. 21, 2002

(30) Foreign Application Priority Data

Jul. 10, 2000 (JP) .................................. P2000-207930
May 25, 2001 (JP) .................................. P2001-156765

(51) Int. Cl.[7] .............................................. F16C 13/00
(52) U.S. Cl. ........................ 384/544; 384/589; 384/625
(58) Field of Search ................................ 384/544, 589, 384/625

(56) References Cited

U.S. PATENT DOCUMENTS

| | | | |
|---|---|---|---|
| 5,226,738 A | | 7/1993 | Valette et al. .................. 384/513 |
| 5,490,732 A | | 2/1996 | Hofmann et al. ............... 384/537 |
| 5,549,514 A | * | 8/1996 | Welschof ....................... 464/145 |
| 5,556,210 A | * | 9/1996 | Fukumura ...................... 384/514 |
| 5,797,686 A | * | 8/1998 | Kawamura et al. ........... 384/544 |
| 6,146,022 A | * | 11/2000 | Sahashi et al. ............... 384/544 |
| 6,363,799 B1 | * | 4/2002 | Toda et al. ................. 73/862.49 |
| 6,398,419 B1 | * | 6/2002 | Kashiwagi et al. ........... 384/537 |

FOREIGN PATENT DOCUMENTS

EP 0854303 A2 7/1998

* cited by examiner

*Primary Examiner*—Lenard A. Footland
*Assistant Examiner*—Julie K. Smith
(74) *Attorney, Agent, or Firm*—Jordan & Hamburg LLP

(57) ABSTRACT

A bearing apparatus includes a hollow shaft provided around an outer peripheral surface with a bearing fitting region, and a rolling bearing having an inner ring fitted around the bearing fitting region of the hollow shaft. A shaft end of the hollow shaft is bent outwardly in a diametrical direction, thereby being caulked on an outer end surface of the inner ring. The bearing fitting region has a hardened layer in a region from a first position corresponding to an inner end surface of the inner ring of the rolling bearing to a second position before a position corresponding to an outer end surface of the inner ring, and has a non-hardened layer in another region from the outer end surface corresponding position of the inner ring to the shaft end. The second position representative of a caulked side end portion of the hardened layer is defined based on a predetermined relational expression.

8 Claims, 4 Drawing Sheets

F I G. 2
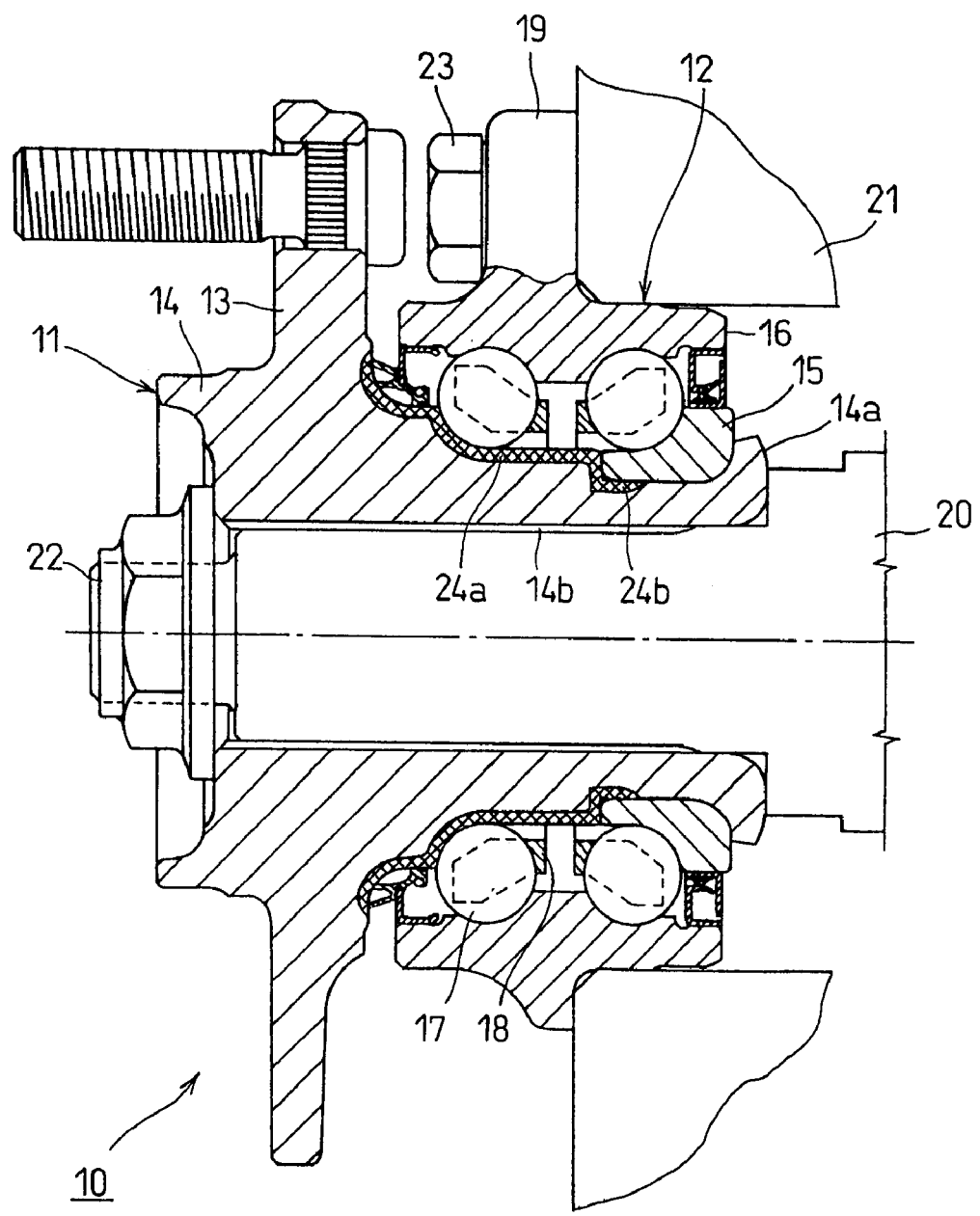

BEARING APPARATUS AND PRODUCING METHOD THEREOF

BACKGROUND OF THE INVENTION

The present invention relates to a bearing apparatus and a producing method thereof, and more particularly, to a bearing apparatus and a producing method thereof which are preferably used for a hub unit for a vehicle such as an automobile.

A hub unit for a vehicle will be explained. The hub wheel has a hollow shaft. An inner ring of a rolling bearing is mounted to an outer periphery of the hollow shaft by press-fit. A shaft end of the hollow shaft is caulked on the outer end surface of the inner ring by bending the shaft end outwardly in a diametrical direction. The bearing is prevented from slipping off from the hollow shaft by this caulked portion. A pre-load is applied to the inner ring of the bearing by this caulking.

A load is applied to the hollow shaft by the pressure-fit of the inner ring of the bearing. The hollow shaft is formed around its outer periphery with a hardened layer due to heat by quenching or the like in order that the hollow shaft has the structure that can bear the load. On the other hand, the shaft end of the hollow shaft remains in a stage of being caulked on the outer end surface of the inner ring, i.e., the shaft end is not hardened.

A range of the hardened layer formed on the outer periphery of the hollow shaft is limited to a certain degree.

However, in the range where the hardened layer is formed, a position of the caulked side end portion in the axial direction is not clearly defined. Thus, when it is processed to be hardened, the position of the caulked side end portion of the hardened layer in its add is prone to be an incorrect position closer to an outer end or to inner end in the axial direction from the limited range.

If the position of the end portion in the axial direction of the hardened layer is positioned incorrectly with respect to the hollow shaft, a gap may be generated between an inner peripheral surface of the inner ring and an outer peripheral surface of the hollow shaft caulked on the outer end surface thereof in some cases. This gap deteriorates creep resistance.

Therefore, a caulking auxiliary jig is previously inserted on the side of the inner periphery of the hollow shaft before caulking, thereby preventing the gap from being generated. Further, after the caulking, the inner periphery of the hollow shaft is again worked. Such a gap-preventing operation of the hollow shaft increases the number of producing steps and cost of the hub unit.

SUMMARY OF THE INVENTION

Thus, it is a main object of the present invention to provide a bearing apparatus of a hub unit, and the like, for a vehicle, capable of appropriately managing a position of an end portion, in the axial direction, of a hardened layer formed on an outer periphery of a hollow shaft.

Other objects, features and merits of the present invention will be apparent from the following description.

The present invention is, in sum, described as follows. A bearing apparatus of the present invention includes a hollow shaft provided around its outer peripheral surface with a bearing fitting region, and a rolling bearing having an inner ring fitted around the bearing fitting region of the hollow shaft. A shaft end of the hollow shaft is bent outwardly in a diametrical direction, thereby being caulked on an outer end surface of the inner ring of the rolling bearing.

The bearing fitting region has a hardened layer in its region from an inner end surface corresponding position of the inner ring of the rolling bearing to a portion before an outer end surface corresponding position. The bearing fitting region further has a non-hardened layer in its region from the portion before the outer end surface corresponding position of the inner ring to the shaft end of the hollow shaft.

A position of a caulked side end portion of the hardened layer is defined based on the following relational expression (1):

$$((A-C-D)Y/E) \leq X < (A-C) \tag{1}$$

wherein A represents a width in the axial direction of the inner ring, C represents a chamfering length in the axial direction in the outer end surface of the caulked side of the inner ring, D represents a chamfering length in the axial direction in an outer end surface of the inner ring, E represents a thickness of the hollow shaft, X represents a distance from a position of the chamfering length D to the caulked side end portion of the hardened layer, and $Y(<E)$ represents a hardening treatment depth.

With this defining expression, appropriate hardening treatment can be carried out by applying concrete numerical values to the respective length in the axial direction of the inner ring and the thickness of the hollow shaft. Further, it is possible to reduce the number of steps and time of the producing operation of the bearing apparatus, such as a hub unit, and to enhance the productivity.

In the present invention, preferably, the hollow shaft is a hub wheel, the rolling bearing is a double row angular contact ball bearing with vertex of contact angles outside of bearing or a double row tapered roller bearing with vertex of contact angles outside of bearing.

These and other objects, as well as advantages, of the invention will become clear by the following description of preferred embodiments of the invention with reference to the accompanying drawings, wherein like components are indicated by the same numerals.

BRIEF DESCRIPTION OF THE DRAWINGS

FIG. 2 corresponds to FIG. 1 and is a vertical sectional view after caulking;

DETAILED DESCRIPTION OF PREFERRED EMBODIMENTS

Figure 3:
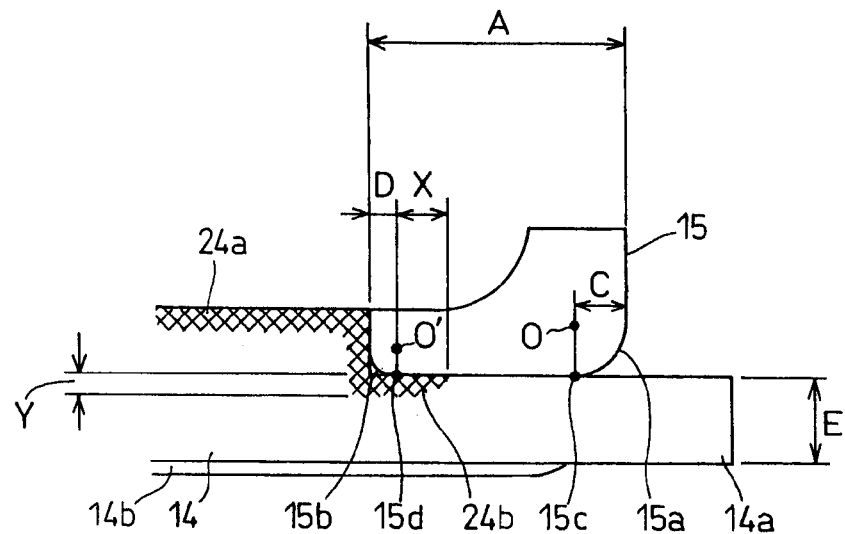
FIG. 3 is an enlarged sectional view of an essential portion in FIG. 1.

A hub unit for a driving wheel of a vehicle as a bearing apparatus according to a preferred embodiment of the present invention will be explained with reference to FIGS. 1 to 3.

A hub unit 10 includes a hub wheel 11 and a bearing 12.

The hub wheel 11 includes a flange 13 and a hollow shaft 14. A wheel (not shown) is mounted to the flange 13. The hollow shaft 14 has a bearing fitting region comprising a large-diameter outer peripheral surface and a small-diameter outer peripheral surface. The bearing 12 is fixed to the bearing fitting region.

Figure 1:
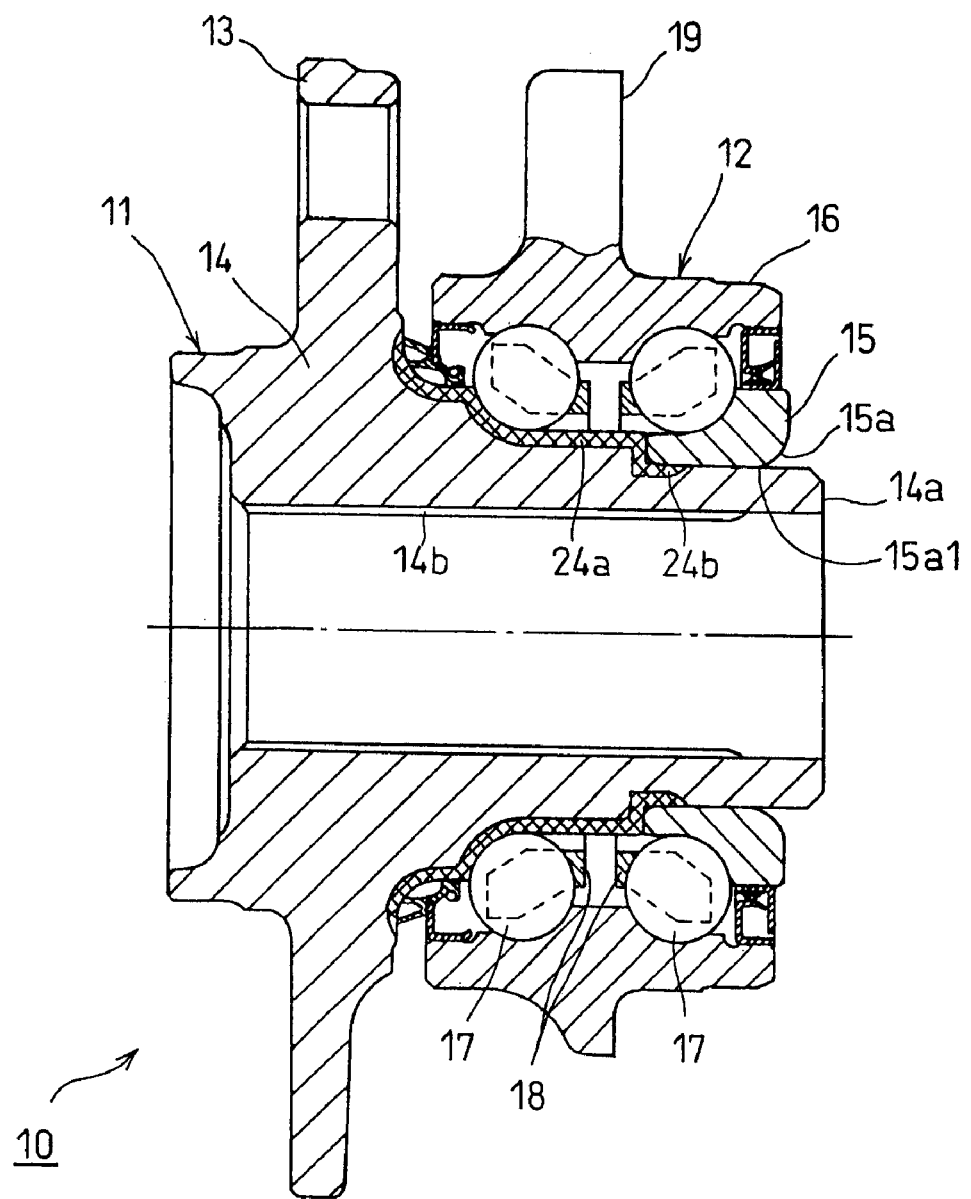
FIG. 1 is a vertical sectional view of a hub unit before caulking according to a preferred embodiment of the present invention.

A shaft end 14a of the hollow shaft 14 is bent outwardly in a diametrical direction from a state shown in FIG. 1 by rolling caulking and is plastically deformed. With this operation, the shaft end 14a is caulked on an outer end surface of an inner ring 15 of an angular contact ball bearing 12 as shown in FIG. 2.

The bearing 12 is a double row angular contact ball bearing with vertex of contact angles outside of bearing as one example of an inclined rolling bearing. The bearing 12 includes an inner ring (first inner ring) 15 having a single orbit which is fitted around the small-diameter outer peripheral surface of the bearing fitting region of the hollow shaft 14, a single outer ring 16 having two rows of orbit grooves, a plurality of balls 17 arranged in two rows, and two cages 18.

The large-diameter outer peripheral surface of the bearing fitting region of the hollow shaft 14 of the hub wheel 11 is one inner ring (second inner ring) of the bearing 12. An inner ring of a common single raw angular contact ball bearing is used as the inner ring 15 as it is.

The outer ring 16 is provided around its outer periphery with a flange 19.

The caulking operation of the hub unit 10 will be explained.

The shaft end 14a of the hollow shaft 14 is caulked on the outer end surface of the inner ring 15 from a state shown in FIG. 1 to a state shown in FIG. 2. Thereafter, the hub unit 10 is mounted between a drive shaft 20 and a knuckle (or carrier) 21 of the vehicle. That is, the hollow shaft 14 of the hub wheel 11 is spline-fitted into the drive shaft 20 and coupled by a nut 22. The flange 19 of the outer ring 16 of the bearing 12 is non-rotatably coupled to the knuckle (or carrier) 21 by means of a bolt 23.

Features of the present embodiment will be explained with reference to FIG. 3.

The outer end surface of the inner ring 15 of the bearing 12 has an inner peripheral angle portion 15a. The inner peripheral angle portion 15a is roundly chamfered, e.g., from a center O through ¼ circumference of radius of curvature C. An inner end surface in the inner ring 15 of the bearing 12 has an inner peripheral angle portion 15b. The inner peripheral angle portion 15b is roundly chamfered, e.g., from the center O through ¼ circumference of radius of curvature C.

The inner peripheral angle portion 15a has a chamfering-start point 15c. The chamfering-start point 15c is a bending-start point when the shaft end 14a of the hollow shaft 14 is bent outwardly in a diametrical direction around the outer end surface of the inner ring 15. The inner peripheral angle portion 15b of the inner ring 15 has a chamfering-start point 15d.

In the bearing fitting region of the hollow shaft 14, hardened layers 24a and 24b are formed from the large-diameter outer peripheral surface to the small-diameter outer peripheral surface thereof as shown with cross hatchings in the drawings.

The hardened layer 24b formed on the small-diameter outer peripheral surface into which the inner ring 15 of the bearing 12 is fitted is hardened through a required depth from its surface by thermal treatment such as quenching in a region from a position (first corresponding position) corresponding to an inner end surface of the inner ring 15 to a portion before a position (second corresponding position) corresponding to an outer end surface.

A range of the hollow shaft 14 from its portion before the second corresponding position to the shaft end 14a of the hollow shaft 14 is non-hardened layer. With this layer, it is possible to caulk the shaft end 14a with respect to the outer end surface of the inner ring 15 outwardly in a diametrical direction.

Here, the portion before the second corresponding position is defined as a position (X) of the caulked side end portion of a hardened layer 24.

The position (X) of the caulked portion is defined between the bending-start point 15c and a position which is determined by a thickness (E) of the hollow shaft 14 and a fitting region length (A–C–D) of the hollow shaft 14 into the inner ring 15 in the small-diameter outer peripheral surface with respect to at least predetermined hardening treatment depth (Y).

The definition of the position (X) of the caulked side end portion of a hardened layer 24b will be explained in detail.

A length in the axial direction of the inner ring 15 of the angular contact ball bearing 12 is defined as (A), a chamfering length in the axial direction of the outer end surface of the inner ring 15 is defined as (C), a chamfering length in the axial direction of the inner end surface of the inner ring 15 is defined as (D), an axial thickness of the hollow shaft 14 is defined as (E), a distance from the position of the chamfering length (D) in the inner ring 15 to the caulked side end portion of the hardened layer 24b is defined as (X), and a hardening treating depth is defined as (Y). However, when the inner peripheral surface of the hollow shaft 14 is formed with female spline as in this embodiment, the axial thickness (E) is a thickness from the outer periphery of the hollow shaft 14 to the bottom of the tooth of the female spline.

The position (X) of the caulked side end portion of the hardened layer 24b is defined in a range shown with the following expression (1).

$$((A-C-D)Y/E) \leq X < (A-C) \qquad (1)$$

In the expression (1), the left side term $(A-C-D)Y/E$ is based on a condition that the fitting region length between the hollow shaft 14 and the inner ring 15 when the hollow shaft 14 is caulked and deformed is defined as (A–C–D), the axial thickness of the hollow shaft 14 is defined as (E)mm, the position of the caulked terminal end of the hardened layer 24b is defined as (X) mm, and the hardening treatment depth of the hardened layer 24b is defined as (Y) mm. In this case, according to experiments and calculations by the present inventors, an expression (A–C–D):E =X:Y is established. From this expression, the relation (A–C–D)Y/E is established.

TABLE 1

|  |  |  | Bearing (1) | Bearing (2) |
|---|---|---|---|---|
| Desk checking | Size mm | A | 18 | 22 |
|  |  | C | 4.5 | 4.5 |
|  |  | D | 2.5 | 2.5 |
|  |  | E | 5 | 3.5 |
|  |  | Y | 2.5 | 2.5 |
|  | X (min.) | (A-C-D)*Y/E | 5.5 | 10.7 |
|  | X (max.) | A-C | 13.5 | 17.5 |
|  | X (min.) + D |  | 8.0 | 13.2 |
|  | X (max.) + D |  | 16.0 | 20.0 |
| Result of test | X + D |  | 0 | x | x |
| On interface | mm |  | 2 | x | x |

TABLE 1-continued

|  |  | Bearing (1) | Bearing (2) |
|---|---|---|---|
| between inner ring and shaft | 3 | x | x |
| O:no clearance exists | 5 | x | x |
|  | 8 | O | x |
| x: clearance exists | 10 | O | x |
|  | 13 | O | O |
|  | 15 | O | O |
|  | 17 | x | O |
|  | 20 | — | O |
|  | 22 | — | x |

In Table 1, "Result of test" shows the result after changing the value of X by each size (A, C, D, E, and Y) of the bearing shown in "Desk checking." X(min) represents the minimum value of X, and X(max) represents the maximum value of X. The bearings (1) and (2) are only different in size, and they are employed in the test in order to obtain the relational expression (1) that satisfies in the cases of bearings with different sizes.

That is, when the hardened layer 24b is formed on the hollow shaft 14, if the length in the axial direction of the hollow shaft 14 is long, the treatment width of the hardened layer 24b in the axial direction becomes long correspondingly. If the shaft thickness (E) of the hollow shaft 14 is increased, the load bearing capacity from the inner ring 15 is increased and thus, the thickness (Y) of the hardened layer 24b may be shallow correspondingly.

Therefore, from the left side term (A–C–D)Y/E of the above expression (1), the position (X) of the caulked side end portion of the hardened layer 24b is proportional to the hardening treatment depth (Y) and the fitting region length (A–C–D) between the hollow shaft 14 and the inner ring 15, and is inversely proportional to the shaft thickness (E) of the hollow shaft 14.

From the above reasons, it is possible to harden the hollow shaft 14 by defining the position (X) of the caulked side end portion of the hardened layer 24b in the region of the expression (1).

The hollow shaft 14 of the hub wheel 11 has low load bearing capacity of the inner ring 15. Therefore, the position (X) of the caulked side end portion of the hardened layer 24b is important. Thus, the hollow shaft 14 by defining the position (X) of the caulked side end portion of the hardened layer 24b is defined as a position defined based on the length in the axial direction and axial thickness of the hollow shaft 14 which is caulked and deformed in shortest. With this design, it is possible to optimize the caulking load of the shaft end of the hollow shaft 14 with respect to the outer end surface of the inner ring 15, and to optimize the load bearing capacity of the inner ring 15.

From the above reasons, in the small-diameter outer peripheral surface of the hollow shaft 14, the range from the position (X) to the shaft end is non-hardened layer. Therefore, at the time of caulking, no gap is generated between the small-diameter outer peripheral surface and the inner peripheral surface of the inner ring 15 in that range, and the hollow shaft 14 is caulked with respect to the outer peripheral surface of the inner ring 15. The range from the first corresponding position to the position (X) is formed as the hardened layer 24. Therefore, no gap is generated between the small-diameter outer peripheral surface and the inner peripheral surface of the inner ring 15 in that range, and the hollow shaft 14 is caulked with respect to the outer peripheral surface of the inner ring 15. As a result, the hub unit 10 has excellent creep resistance.

When the hub unit 10 is produced, it is unnecessary to previously insert the caulking auxiliary jig into the inner diameter side of the hollow shaft 14 to prevent a gap from being generated, and to work the inner diameter of the hollow shaft 14.

For these reasons also, the structure of the hub unit 10 is suitable for mass production in which the number of steps and time of the production can be reduced.

In the above case, if the axial chamfering length of the inner peripheral angle portion of the outer end surface of the inner ring 15 is added to the correlation in the definition of the shortest position of the caulked side end portion of the hardened layer 24b, it is possible to manage the position of the caulked side end portion of the hardened layer 24b more appropriately.

The present invention is not limited to the above embodiment, and various applications of modifications are possible.

Figure 4:
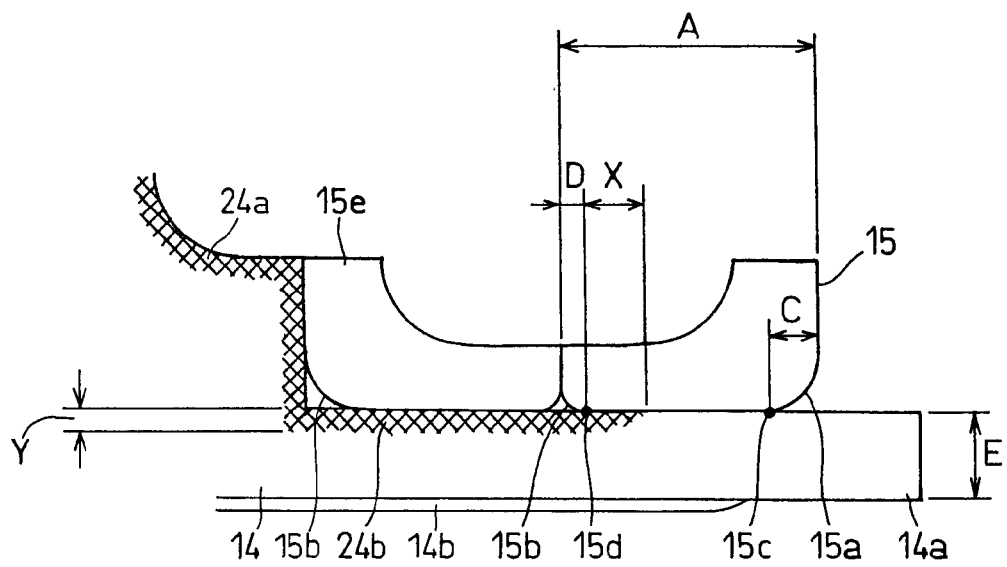
FIG. 4 is an enlarged sectional view of an essential portion according to another preferred embodiment of the invention.

(1) According to the present invention, as shown in FIG. 4, the above hardened layer 24b can also be applied to a hub unit in which the first inner ring 15 and the second inner ring 15e have a bearing 12 disposed adjacent thereto in its axial direction. In this case, both the first inner ring 15 and the second inner ring 15e are fitted around the small-diameter outer peripheral surface of the hollow shaft 14. The shaft end of the hollow shaft 14 is caulked on the outer end surface of the first inner ring 15.

(2) In the invention, a double row tapered roller bearing with vertex of contact angles outside of bearing may be used. An inner ring in that case may comprise one inner ring and an inner ring and another inner ring which is integrally formed on an outer peripheral surface of the hollow shaft, or may comprise two inner rings adjacently disposed in the axial direction, like the double row angular contact ball bearing with vertex of contact angles outside of bearing. The above hardened layer 24 can also be applied to a hub unit having the tapered roller bearing with vertex of contact angles outside of bearing.

Figure 5:
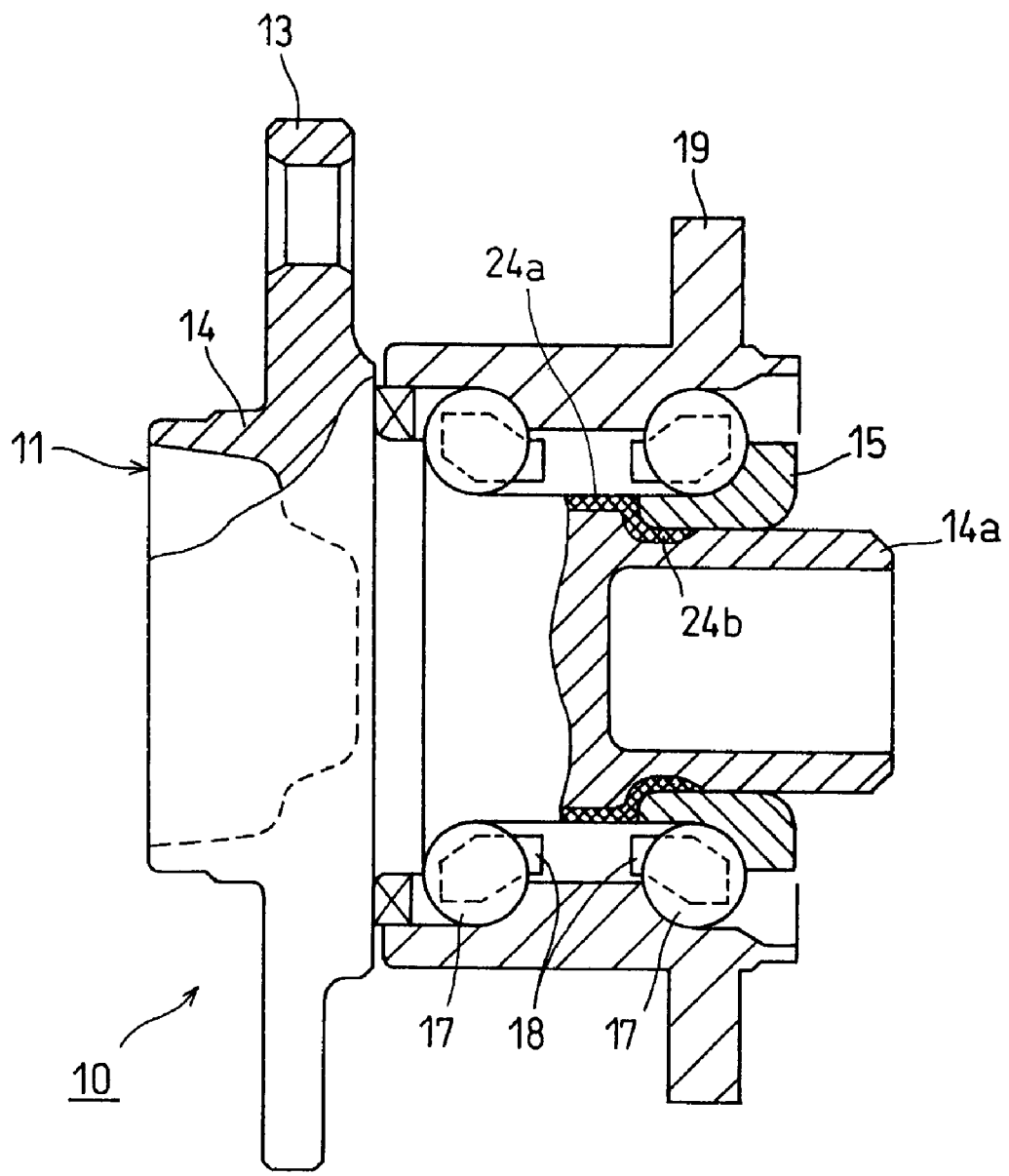
FIG. 5 is an enlarged sectional view of an essential portion according to another preferred embodiment of the invention.

(3) The present invention is not limited to the hollow shaft 14 which is hollow in the axial direction, and as shown in FIG. 5, the hardened layer 24b can also be applied to a hub unit having a bottomed shaft 14a.

(4) The present invention is not limited to the driving wheel of a vehicle, and the hardened layer 24b can also be applied to a hub unit for a follower wheel of the vehicle.

(5) An inner periphery of the hollow shaft 14 of the hub wheel 11 is formed with the female spline 14b meshing with male spline formed on an outer periphery of the drive shaft 20 for fitting the drive shaft 20 into the hollow shaft 14.

In order to couple the hollow shaft 14 and the drive shaft 20 to each other with mechanically necessary strength, it is preferable that the spline 14b is formed in the axial direction on the inner periphery of the hollow shaft 14. With this design, an end of the spline 14b is close to the caulked portion. According to this design, in a region close to the caulked portion, the male spline of the drive shaft 20 is prone to be deformed such as to be shrunk in the diametrical direction in such a degree that the male spline of the drive shaft 20 can not be fitted into the female spline easily when the caulked portion is caulked. This deformation could reach 50 mm in the diametrical direction in some cases. To avoid this deformation, the following first and second producing methods are proposed.

In the first producing method, the spline 14b is subjected to a primary working such as spline broach with respect to the inner periphery of the hollow shaft 14 before caulking, and the spline 14b on the inner periphery of the hollow shaft 14 after caulking is subjected to a secondary working such as the spline broach. In the case of the secondary working, a deformed portion of the spline 14b formed by the primary working generated during the caulking working is subjected to correcting working such as plastically deformation so that the spline of the drive shaft 20 can be fitted.

In the second producing method, the inner periphery of the hollow shaft 14 is not formed with the spline 14b before caulking, and the inner periphery of the hollow shaft 14 is formed with the spline 14b by mechanical working such as spline broach after caulking.

With any of the methods, it is possible to enhance the shape precision of the spline 14b formed on the inner periphery of the hollow shaft 14 after caulking. Therefore, it is possible to easily fit the spline formed on the outer periphery of the drive shaft 20 to the spline 14b.

(6) In the invention, a structure in which the first inner ring 15 and the second inner ring 15e of the common single row angular contact ball bearing may be subject to the spline broach as in the same manner as that of above (5) with respect to the spline 14b to the periphery of the hollow shaft 14 as partially shown in FIG. 4.

While there has been described what is at present considered to be preferred embodiments of this invention, it will be understood that various modifications may be made therein, and it is intended to cover in the appended claim all such modifications as fall within the true spirit and scope of this invention.

What is claimed is:

1. A bearing apparatus comprising:

a hollow shaft including a bearing fitting region around a peripheral surface thereof; and a rolling bearing having an inner ring fitted around said bearing fitting region of said hollow shaft, a shaft end of said hollow shaft being bent outwardly in a diametrical direction, thereby being caulked on an outer end surface of said inner ring of said rolling bearing, said bearing fitting region including a hardened layer in a region thereof from a first position corresponding to an inner end surface of the inner ring of said rolling bearing to a second position before a position corresponding to an outer end surface of the inner ring of said roller bearing, said bearing fitting region further including a non-hardened layer in another region from said second position to the shaft end of said hollow shaft, and said second position, which corresponds to a caulked side end portion of said hardened layer, being defined based on the following relational expression (1):

$$((A-C-D)Y/E) \leq X < (A-C) \qquad (1)$$

wherein A represents a width in the axial direction of said inner ring, C represents a chamfering length in the axial direction in the outer end surface of said inner ring, D represents a chamfering length in the axial direction in an inner end surface of said inner ring, E represents a thickness of said hollow shaft, X represents a distance from a position of said chamfering length D to the caulked side end portion of the hardened layer, and Y(<E) represents a hardening treatment depth.

2. The bearing apparatus according to claim 1, wherein said hollow shaft is a hub wheel, and said rolling bearing is a double row angular contact ball bearing with vertex of contact angles outside of the bearing.

3. The bearing apparatus according to claim 1, wherein said hollow shaft is a hub wheel, and said rolling bearing is a double row tapered roller bearing with vertex of contact angles outside of the bearing.

4. The bearing apparatus according to claim 1, wherein said hollow shaft is hollow in an axial direction thereof.

5. The bearing apparatus according to claim 1, wherein said bearing apparatus is a hub unit for a driving wheel of a vehicle.

6. The bearing apparatus according to claim 1, wherein said bearing apparatus is a hub unit for a follower wheel of a vehicle.

7. A bearing apparatus comprising:

a hub wheel; and a double row angular contact ball bearing with vertex of contact angles outside of the bearing, said hub wheel having a flange outward in a diametrical direction to which a vehicle wheel is mounted, and a hollow shaft having a bearing fitting region to which said bearing is fitted, said bearing fitting region having a large-diameter outer peripheral surface and a small-diameter outer peripheral surface, said bearing including a first inner ring having a single orbit which is fitted around said small-diameter outer peripheral surface of said hollow shaft, an outer ring having two rows of orbit grooves, a plurality of balls arranged in two rows, two cages, and a second inner ring defined by said large-diameter outer peripheral surface of said hollow shaft, a shaft end of said hollow shaft being caulked on the outer end surface of said first inner ring, the small-diameter outer peripheral surface in the bearing fitting region of said hollow shaft including a hardened layer in a range from a first position corresponding to an inner end surface of said first inner ring to a second position before a position corresponding to an outer end surface of said first inner ring, and having a non-hardened layer from said second position to the shaft end of said hollow shaft, and said second position, which corresponds to a caulked side end portion of said hardened layer, being defined based on the following relational expression (1):

$$((A-C-D)Y/E) \leq X < (A-C) \qquad (1)$$

wherein A represents a width in the axial direction of said first inner ring, C represents a chamfering length in the axial direction in the outer end surface of said first inner ring, D represents a chamfering length in the axial direction in an inner end surface of said first inner ring, E represents a thickness of said hollow shaft, X represents a distance from a position of said chamfering length D to the caulked side end portion of the hardened layer, and Y(<E) represents a hardening treatment depth.

8. A bearing apparatus comprising:

a hub wheel; and a double row angular contact ball bearing with vertex of contact angles outside of bearing, said hub wheel having a flange outward in a diametrical direction to which a vehicle wheel is mounted, and a hollow shaft having a bearing fitting region to which said bearing is fitted, said bearing fitting region having a large-diameter outer peripheral surface and a small-diameter outer peripheral surface, said bearing including first and second inner rings having a single orbit which adjacently disposed in an axial direction thereof on a small-diameter outer peripheral surface of said hollow shaft, an outer ring having two rows of orbit grooves, a plurality of balls arranged in two rows, and two cages, and said first inner ring being disposed on the side of the shaft end of said hollow shaft with respect to said second inner ring, a shaft end of said hollow shaft is caulked on the outer end surface of said first inner ring, the small-diameter outer peripheral surface in the bearing fitting region of said hollow shaft including a hardened layer in a range thereof from a first position corresponding to a side of said second inner ring to a second position corresponding to a position before an outer end surface said first inner ring, the small-diameter outer peripheral surface in the bearing fitting region of said hollow shaft further including a non-hardened layer from the second position to the shaft end of said hollow shaft, and the second position, which corresponds to caulked side end portion of said hardened layer, being defined based on the following relational expression (1):

$$((A-C-D)Y/E) \leq X < (A-C) \tag{1}$$

wherein A represents a width in the axial direction of said first inner ring, C represents a chamfering length in the axial direction in the outer end surface of said first inner ring, D represents a chamfering length in the axial direction in an inner end surface of said first inner ring, E represents a thickness of said hollow shaft, X represents a distance from a position of said chamfering length D to the caulked side end portion of the hardened layer, and Y(<E) represents a hardening treatment depth.

* * * * *